US012104788B2

(12) United States Patent
Robertson et al.

(10) Patent No.: US 12,104,788 B2
(45) Date of Patent: Oct. 1, 2024

(54) METHOD AND APPARATUS FOR IMPROVING FURNACE TEMPERATURE UNIFORMITY

(71) Applicant: Fives North American Combustion, Inc., Cleveland, OH (US)

(72) Inventors: Thomas F. Robertson, Medina, OH (US); Benjamin M. Witoff, Lakewood, OH (US); Justin R. Dzik, Strongsville, OH (US)

(73) Assignee: Fives North American Combustion, Inc., Cleveland, OH (US)

( * ) Notice: Subject to any disclaimer, the term of this patent is extended or adjusted under 35 U.S.C. 154(b) by 637 days.

(21) Appl. No.: 17/137,603

(22) Filed: Dec. 30, 2020

(65) Prior Publication Data

US 2022/0205635 A1 Jun. 30, 2022

(51) Int. Cl.
*F23N 1/02* (2006.01)
*F27D 19/00* (2006.01)

(52) U.S. Cl.
CPC ............. *F23N 1/022* (2013.01); *F27D 19/00* (2013.01); *F23N 2223/22* (2020.01); *F23N 2225/08* (2020.01); *F27D 2019/0018* (2013.01); *F27D 2019/004* (2013.01)

(58) Field of Classification Search
USPC ........................................................... 431/12
See application file for complete search history.

(56) References Cited

U.S. PATENT DOCUMENTS 4,265,651 A * 5/1981 Morel ........................ F23D 1/00 65/252
2019/0003772 A1* 1/2019 Esmaili .................. F27D 19/00

* cited by examiner

*Primary Examiner* — Steven B McAllister
*Assistant Examiner* — John E Bargero
(74) *Attorney, Agent, or Firm* — Benesch Friedlander Coplan & Aronoff LLP

(57) ABSTRACT

A method includes firing a first burner into a furnace process chamber in a first initial condition, firing a second burner into the process chamber in a second initial condition, and measuring temperature at each of an array of locations in the process chamber. The first burner is adjusted to a first adjusted condition while the second burner is being fired at the second initial condition, and a resulting first temperature change is measured at each of the locations. The second burner is adjusted to a second adjusted condition while the first burner is being fired at the first initial condition, and a resulting second temperature change is measured at each of the locations. The measured first and second temperature changes are recorded as reference data for adjusting burner conditions to adjust temperatures at each of the locations. The method can thus be used to improve temperature uniformity throughout the array of locations.

7 Claims, 3 Drawing Sheets

| BURNER | TC-1 | TC-2 | TC-3 | TC-4 | TC-5 | TC-6 | TC-7 | TC-8 | TC-9 |
|---|---|---|---|---|---|---|---|---|---|
| 1 | 0.55 | 0.21 | 1.00 | 0.24 | 0.81 | 0.92 | 0.25 | 0.61 | 0.18 |
| 2 | 0.20 | 0.56 | 0.25 | 1.00 | 0.80 | 0.26 | 0.91 | 0.17 | 0.60 |
| 3 | 0.75 | 0.10 | 0.68 | 0.35 | 0.61 | 0.74 | 0.49 | 1.00 | 0.11 |
| 4 | 0.43 | 0.35 | 0.82 | 0.82 | 1.00 | 0.95 | 0.96 | 0.39 | 0.41 |
| 5 | 0.10 | 0.74 | 0.34 | 0.69 | 0.62 | 0.49 | 0.73 | 0.12 | 1.00 |

Fig.5

METHOD AND APPARATUS FOR IMPROVING FURNACE TEMPERATURE UNIFORMITY

TECHNICAL FIELD

This technology includes a method and apparatus for improving temperature uniformity in heating and heat treating furnaces used for material processing.

BACKGROUND

Temperature uniformity certification is required for steel heating, forge, and heat treat furnaces. The majority of these furnaces are of a simple rectangular box shape. The furnace will have a door on one side for loading and unloading the furnace. The combustion system is typically either fired on the walls adjacent to the door, in a side or cross-fired arrangement, or on the back wall opposite the door in an end-fired arrangement. The combustion system will be comprised of a number of burners positioned high on the fired wall above the load intended for heating. Cross-fired burners can also be located low on the wall, firing beneath the load when it is placed on piers in the furnace. The total number of burners is dependent on many factors, including furnace geometry, load weight and composition, heating rate, maximum temperature, and the temperature uniformity required.

The space where the load is placed in any furnace is called the "work zone". This is where the load is heated to a specified temperature. Over time, the need for higher performance parts for the aerospace and energy industries (and others) has driven a need for higher temperature uniformity in the work zone of the heating furnace. There are specifications for this heating quality formalized by ASTM and others concerned with the strength and consistency of these formed metal parts.

In order to meet these specifications, a furnace needs to have the work zone certified on a regular basis. This is done by placing a three-dimensional array of thermocouples into the work zone, closing the door, and bringing the furnace to one or more temperature setpoints where the load would be soaked and the desired metallurgical properties achieved. The number of thermocouples is based on the size of the furnace and the uniformity required. The desired uniformity must be achieved at all furnace setpoints. An example of a uniformity requirement is that a companies' F1 furnace must meet AMS2750F, Class III heating requirements at three soak points. This means that all the thermocouples on the certification test array must be +/−15 F at each soak point, e.g., 1500 F+/−15 F, 1900 F+/−15 F, and 2200 F+/−15 F. In this way no load placed within the work zone will be heated substantially differently at one point than any other. This allows for multiple pieces or multiple locations to be used in the heating process, all obtaining the desired heating quality and consequently, the desired metallurgy.

To achieve such stringent temperature conditions requires tight control and tuning of the combustion system. Most combustion systems are controlled on a zone basis, with one or more burners on a common air and or fuel header. To achieve the temperature setpoint, the burner firing rate is adjusted. Higher temperatures require higher firing rates or combustion system input. A typical combustion system controller will drive each zone's firing rate up or down to meet demand and to achieve temperature accuracy to the setpoint. Within each zone, individual burners typically have a secondary, manual control mechanism, such as a fuel/air ratio adjustment valve. This secondary adjustment allows each burner to be uniquely biased from all other burners within its zone, allowing that zone to achieve temperature precision to the setpoint. However, this secondary control mechanism cannot be adjusted during routine operation without voiding the work zone certification.

This secondary, fuel/air ratio adjustment is necessary to achieve temperature precision within a work zone because an otherwise perfectly uniform system will not result in perfect uniform temperature distribution. Heat treating furnaces are influenced by various internal and external factors at the heating boundaries, such as door seal leakage, flue location, consistency of refractory thickness and emissivity, fuel and air piping sizes and head losses, and ambient environmental conditions. Therefore, it is often necessary for individual burners within the same work zone to be biased differently from one another to achieve uniform temperature in the work zone.

These secondary adjustments are time consuming, and difficult to make to achieve the intended effect. While each fuel/air valve adjustment is made to a single burner, the resulting change in this burner's firing rate unevenly affects all temperature measurement points within the work zone. If a technician is seeking to raise the temperature in one specific location of the work zone, they can adjust the fuel/air valve of the closest burner. However, this often results in other areas of the work zone heating and cooling in an unwanted fashion. This creates a cascading effect as one adjustment will require another adjustment to resolve the first adjustment's unintended consequences, and so forth.

But this is only the start of the challenge. Once these manual, secondary adjustments are made at the first survey temperature, the furnace is raised to the second survey temperature. Here again uniformity is checked. If it is not in compliance, even if only one thermocouple is out by one degree F. for one minute, the requirements are not met. And if secondary adjustments to the fuel/air ratio of any burner are required to meet the survey at the second temperature, the first temperature set point must be re-run with the new secondary adjustment settings.

The process is repeated until all temperature setpoints meet the required uniformity. This is often required every three months on every certified furnace in a forge or heat treat shop.

SUMMARY

A method is provided for achieving temperature uniformity in a heat treating furnace having a process chamber for material processing. The method can be performed in phases, including a training phase for determining the effects of burner adjustment on temperatures in the process chamber, and a tuning phase in which burner adjustments are made to achieve the desired high degree of uniformity.

The training phase of the method includes firing a first burner into a furnace process chamber in a first initial condition, firing a second burner into the process chamber in a second initial condition, and measuring temperature at each of an array of locations in the process chamber. The first burner is adjusted to a first adjusted condition while the second burner is being fired at the second initial condition, and a resulting first temperature change is measured at each of the locations. The second burner is adjusted to a second adjusted condition while the first burner is being fired at the first initial condition, and a resulting second temperature change is measured at each of the locations. The measured first and second temperature changes are recorded as reference data for adjusting burner conditions to make corresponding adjustments in temperature at each of the locations. The method can thus be used to improve temperature uniformity throughout the array of locations.

A tuning phase of the method is provided for adjusting burner conditions to improve temperature uniformity at an array of locations in a furnace process chamber. The tuning phase includes firing a first burner into the process chamber in a first firing condition, and firing a second burner into the process chamber in a second firing condition. Temperature uniformity is improved by:

a) measuring a temperature at each of an array of locations within the process chamber;

b) inducing a first temperature adjustment at each of the array of locations by adjusting the first firing condition in an amount that is predetermined to induce the first temperature adjustment at each of the array of locations;

c) inducing a second temperature adjustment at each of the array of locations by adjusting the second firing condition in an amount that is predetermined to induce the second temperature adjustment at each of the array of locations; and d) after the inducing steps, measuring an adjusted temperature at each of the array of locations within the process chamber;

wherein the temperature uniformity process is performed in iterations until the measured adjusted temperatures have a predetermined uniformity.

In each phase of the method, the burners are adjusted by making controlled amounts of reactant flow rate adjustments at the burners. In given examples, the reactant flow rates are combustion air flow rates that are adjusted to change the air-fuel ratios at the burners.

BRIEF DESCRIPTION OF THE DRAWINGS

FIG. 5 is a table of temperature change data obtained in performance of the method.

DETAILED DESCRIPTION

Figure 1:
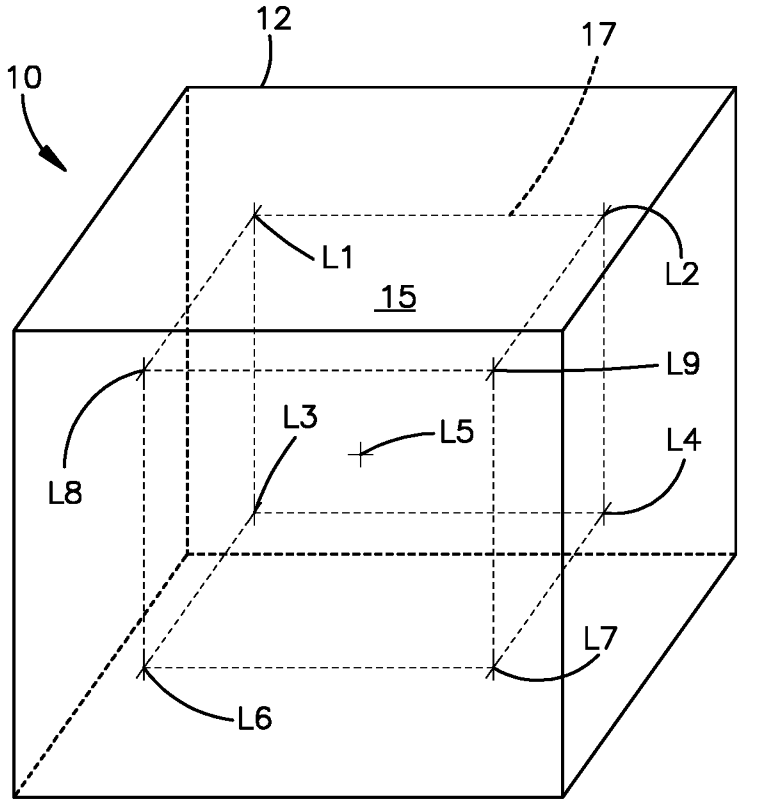
FIG. 1 is a schematic perspective view of a furnace having a process chamber for heating materials in the process chamber.

The apparatus shown in the drawings includes examples of parts that can be operated in steps recited in the method claims. These examples are described here to provide enablement and best mode without imposing limitations that are not recited in the claims.

Figure 2:
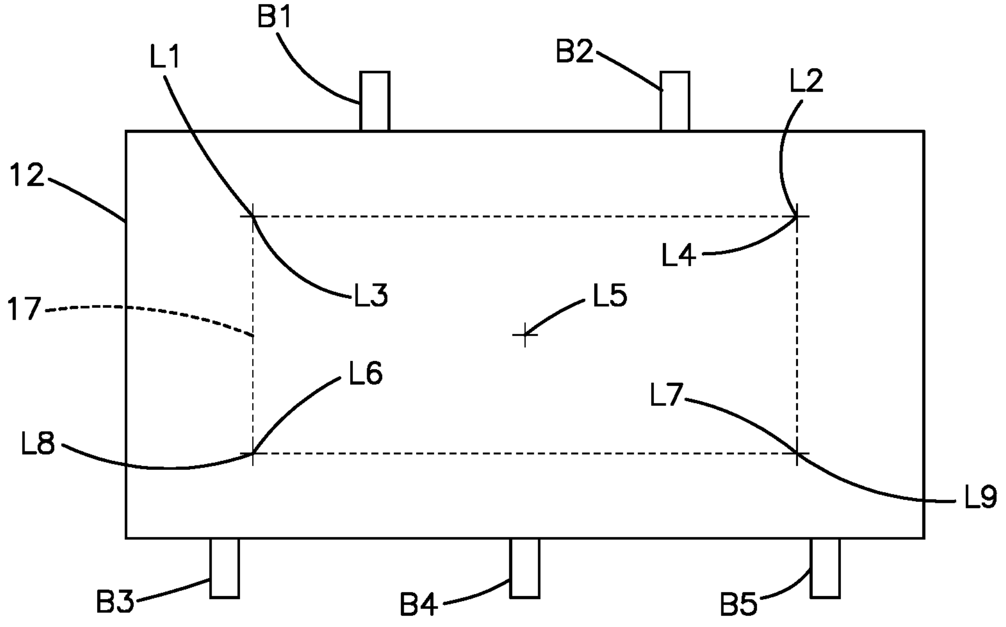
FIG. 2 is a schematic top view of the furnace of FIG. 1.

As shown schematically in FIGS. 1 and 2, a furnace 10 has a wall structure 12 enclosing a process chamber 15 for heating materials. Burners B1-B5 (FIG. 2) on the wall structure 12 are operated in a manner to provide uniform heating in the process chamber 15. More specifically, the process chamber 15 includes a work zone 17 in which uniformity of temperature is sought to be maintained during a process of heating materials in the work zone 17. Such temperature uniformity is improved by a method of operating the burners B1-B5 with reference to temperatures at an array of predetermined locations within the work zone 17. In the given example there are nine such locations L1-L9; with L1-L4 and L6-L9 at the corners of a rectangular array having L5 at the center. The first two burners B1, B2 are arranged to fire into the process chamber 15 above the work zone 17. The other three burners B3-B5 are arranged to fire into the process chamber 15 beneath the work zone 17.

Figure 3:
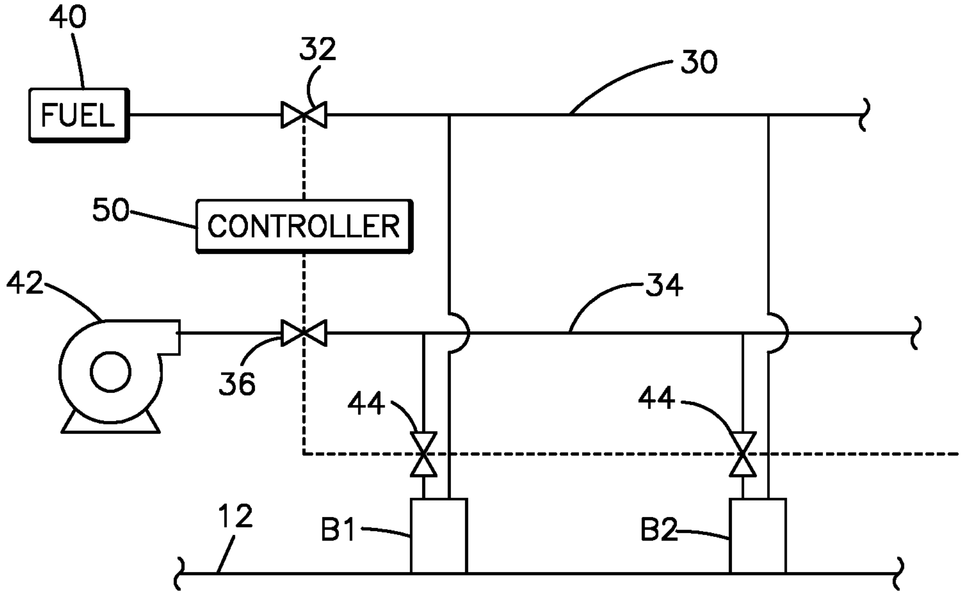
FIG. 3 is an enlarged partial view of a reactant supply and control system for operating the furnace of FIGS. 1 and 2.

As shown partially in FIG. 3, the burners B1-B5 are connected in a reactant supply and control system including a fuel line 30 with a fuel valve 32 and an oxidant line 34 with an oxidant valve 36. The fuel line 30 communicates a fuel source 40, such as a plant supply of natural gas, with all of the burners B1-B5. The oxidant line 30 communicates an oxidant source, such as combustion air blower 42, with all of the burners B1-B5 through individual air valves 44 at each of the burners B1-B5. A 50 controller is configured to operate the valves 32, 36, and 44 to initiate, regulate, and terminate flows of fuel and combustion air to the burners B1-B5. The controller 50 may comprise any suitable programmable logic controller or other control device, or combination of control devices, that can be programmed or otherwise configured to perform as described and claimed.

Figure 4:
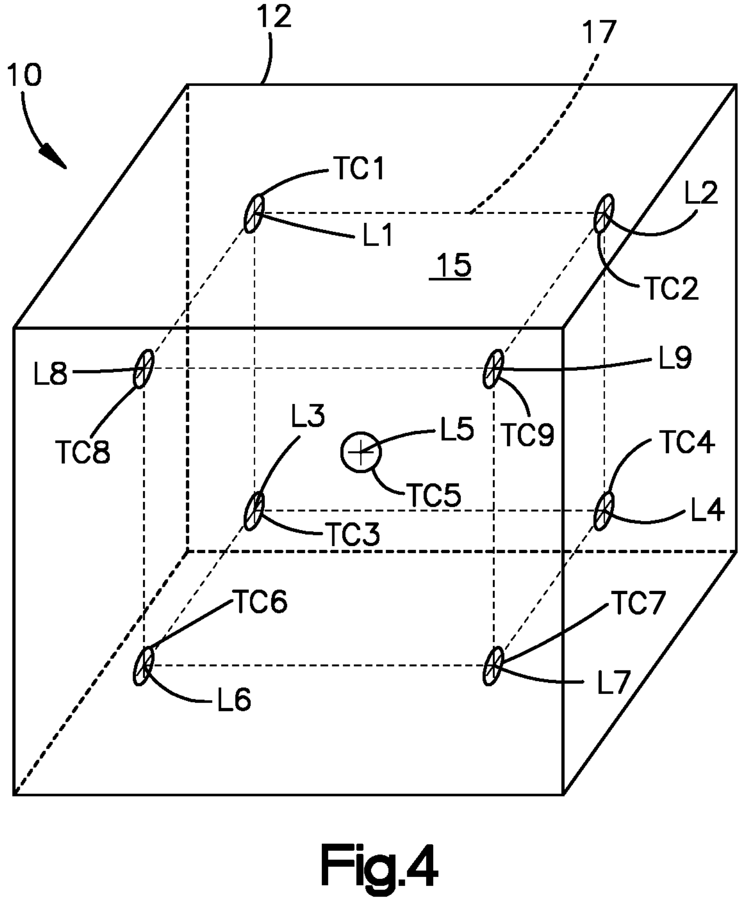
FIG. 4 is a schematic view similar to FIG. 1, showing thermocouples temporarily installed in the furnace.

The apparatus for improving temperature uniformity includes a temporary installation of thermocouples in the work zone 17. As shown in FIG. 4, the given example includes nine thermocouples TC1-TC9, each of which has a respective one of the predetermined locations L1-L9. The thermocouples TC1-TC9 are provided for a survey of temperatures at those locations L1-L9. The controller 50 is further configured to operate the burners B1-B5 in response to temperatures indicated by the thermocouples TC1-TC9.

The method includes a training phase followed by a tuning phase. In the training phase, the burners B1-B5 are fired into the process chamber 15 to raise the temperature to a predetermined survey temperature. The survey temperature may be at or within a predetermined range of a target temperature that is sought to be provided uniformly throughout the work zone 17 in a subsequent heating process.

When the controller 50 determines that an average of temperatures at the thermocouples TC1-TC9 has reached the survey temperature, the air/fuel ratio at each of the burners B1-B5 is considered to be the initial firing condition for the respective burner B1-B5. The temperature indicated by each of the thermocouples TC1-TC-9 is then recorded as the initial temperature at the respective one of the locations L1-L9.

In a following step, one of the five burners B1-B5 is adjusted from the initial condition to an adjusted condition. This can be accomplished, for example, by making a controlled adjustment at the air valve 44 to make a corresponding adjustment of the combustion air flow rate (and the air-fuel ratio) at the first burner B1. While the other four burners B2-B5 are maintained in their initial firing conditions, the temperature change resulting from adjustment of the first burner B1 is measured at each of the nine thermocouples TC1-TC-9. Those temperature changes are recorded as reference data for correlating the adjustment at the first burner B1 with the resulting temperature changes at all of the thermocouples TC1-TC-9. The first burner B1 is then returned to its initial condition so that all five burners B1-B5 are again firing into the process chamber 15 in their initial conditions.

In the next step of the survey, another one of the burners B1-B5, such as the second burner B2, is adjusted from its initial condition to an adjusted condition while the other four burners B1 and B3-B5 are maintained in their initial conditions. As in the preceding step, the temperature change resulting from adjustment of the second burner B2 is measured at each of the nine thermocouples TC1-TC-9. Those temperature changes are recorded as reference data for correlating the controlled adjustment at the second burner B2 with the resulting temperature changes at all of the thermocouples TC1-TC-9. The second burner B2 is then returned to its initial condition so that all five burners B1-B5 are once again firing into the process chamber 15 in their initial conditions.

The foregoing adjustment, measurement, and recording steps are repeated at each of the remaining burners B3-B5. This results in a compilation of data as shown, for example, in the table of FIG. 5. Each tabulated numerical value represents the temperature change that was induced at a respective one of the thermocouples TC1-TC9 by controlled adjustment of the air 44 valve to change the combustion air flow rate at a respective one of the burners B1-B5. Each row of numerical values thus represents the temperature changes that were induced at all nine of the thermocouples TC1-TC9 by controlled adjustment of the air valve 44 at a respective one of the burners B1-B5.

The numerical values in the given example represent a ratio of temperature change over percentage of valve adjustment. Specifically, each of the burners B1-B5 was held in the first adjusted condition for a predetermined period of time. The amounts of adjustment, as well as the predetermined periods of time, may be equal or unequal. The resulting temperature change at each thermocouple TC1-TC9 was measured as a maximum temperature difference during the predetermined period of time. Each resulting temperature change was then recorded as a ratio of the maximum temperature difference and the controlled amount of valve adjustment at the respective burner B1-B5.

Accordingly, valve adjustment at the first burner B1 resulted in a temperature change at the first thermocouple TC1 of 0.55 degrees F. per 1% of valve adjustment. The same percentage of valve adjustment at the first burner B1 resulted in a temperature change of 0.21 degrees F. at the second thermocouple TC2. The next seven numerical values in the first row of the table show temperature changes at all of the other thermocouples TC3-TC9 resulting from the same valve adjustment of the first burner B1. It follows that the second row of the table shows a temperature change of 0.20 degrees at the first thermocouple TC1 upon a 1% valve adjustment at the second burner B2, a corresponding temperature change of 0.56 degrees at the second thermocouple TC2, and so on throughout all of the other thermocouples TC3-TC9. The next three rows of the table likewise provide the same information for each of the other burners B3-B5 at all nine thermocouples TC1-TC9. The table thus serves as sensitivity-response matrix to show how adjustment of any one of the burners B1-B5 affects the temperatures at all of the thermocouples TC1-TC9 when all of the burners B1-B5 are firing into the process chamber 15.

The training phase is thus complete when the measured temperature change data has been recorded. The method can then proceed to a tuning phase in which the recorded data is used to bring the process chamber 15 toward the target heat treatment temperature uniformly throughout all of the predetermined locations L1-L9 in the work zone 17.

The tuning phase can begin by firing the burners B1-B5 as needed to reestablish the target temperature in the work zone 17. When the average value of the temperatures indicated by the thermocouples TC1-TC9 is within a desired range of the target temperature, the amount that each thermocouple TC1-TC9 deviates from the target temperature is measured. The burners B1-B5 are then adjusted to reduce the deviations at the thermocouples TC1-TC9. This is performed in an iterative process in which all of the burners B1-B5 are adjusted in each iteration. The process may be considered complete when the span between the maximum and minimum deviations is reduced to a desired value.

For example, if the maximum deviation is found at TC1, the burners B1-B5 can be adjusted with reference to the table of FIG. 5 to drive the temperature at TC1 toward the target value without driving the temperature at any other thermocouple TC2-TC9 out of the desired range of deviation. The adjustments in each iteration, which are likely be unequal but may include some that are equal, can be done sequentially or simultaneously at all five burners B1-B5. When all five adjustments have been made, the temperature deviations at the thermocouples TC1-TC5 are measured again, and the burners B1-B5 are adjusted again with reference to FIG. 5 to further reduce the deviations as needed throughout all nine thermocouples TC1-TC9.

When the temperature deviation span is reduced to the desired value, the final settings at the burners B1-B5 are recorded. The tuning phase of the method is then complete for the chosen target temperature, and can be repeated for other target temperatures. In each case the final valve settings are recorded for later use in providing the respective target temperature uniformly throughout the work zone locations L1-L9 where the thermocouples TC1-TC9 were used in the training and tuning phases of the method.

An algorithm to find the ideal offset between burner firing rates does not depend on first principles or knowing the physical properties of the furnace. Instead, in a combination of calculus of variations and optimal control theory, the controller 50 is configured to use a multiple input/multiple output (MIMO) control algorithm. The non-linearity of the MIMO control algorithm does not allow for direct solution but rather algorithmic solution by optimal control theory approach. This approach allows for the optimization of a dynamic system over time. The MIMO controller uses all the survey temperatures as feedback and produces a bias offset value to be added or subtracted to the burner firing rates called for by the general control system. A key to the MIMO converging on a solution is a weighting relationship between the inputs and outputs, through a relative gain matrix. The content of the gain matrix must provide enough information to know how to distribute the control action between the burners to affect a uniformly distributed survey temperature. An explicit solution to an exact response vs. firing rate input per burner is not required, all that is important is the relative weight of a burner change relative to other burners at a measurement point.

Given a furnace system with R burners, with burner firing rate biases, U, and the resulting temperature field throughout the work zone measured as T at discrete locations, Q, a MIMO control scheme can be used to solve for burner bias values that achieve temperature uniformity to the required precision. In any furnace, there is likely a different number of temperature measurement points, Q, than there are burners, R, and therefore burner bias values, U. In addition, there is not a one-to-one correlation between bias adjustment, $\Delta U_R$, and temperature measurement, $\Delta T_Q$, changing one bias value will change multiple temperatures in varying degrees. To account for these factors, a sensitivity matrix, K, is used to map the temperature output vector, T, to the burner bias vector, U, according to:

$$T=KU$$

The sensitivity matrix, K, contains information on the relative influence a burner has on a survey temperature compared to other burners.

In order to obtain K, the furnace undergoes a training phase in which isolated burner bias actuation is used to generate an array of temperature response. As each burner is independently actuated, the corresponding column can be constructed in the below equation, where the burner bias vector, U, serves as the system input, and the temperature vector, T, serves as the system output:

$$K = \begin{bmatrix} \frac{\Delta T_1}{\Delta U_1} & \cdots & \frac{\Delta T_1}{\Delta U_R} \\ \vdots & \ddots & \vdots \\ \frac{\Delta T_Q}{\Delta U_1} & \cdots & \frac{\Delta T_Q}{\Delta U_R} \end{bmatrix}$$

Once all burners have been actuated and all columns are calculated, the training phase is complete.

The tuning phase then begins, where the sensitivity matrix, K, is used in reverse to instruct burner bias changes to achieve a desired temperature uniformity distribution. Here, the temperature vector, T, is used as the input and the burner bias vector, U, as the output:

$$\begin{bmatrix} \Delta T_1 \\ \vdots \\ \Delta T_Q \end{bmatrix} = \begin{bmatrix} K_{11} & \cdots & K_{1R} \\ \vdots & \ddots & \vdots \\ K_{Q1} & \cdots & K_{QR} \end{bmatrix} \begin{bmatrix} \Delta U_1 \\ \vdots \\ \Delta U_R \end{bmatrix}$$

The temperature vector, T, is calculated as the deviation of all measured temperatures at locations, Q, from the required survey temperature. Each measurement and resulting burner bias adjustment is conducted iteratively, with a predetermined amount of time between each adjustment in order to allow the measured furnace temperatures to level out.

This written description sets forth the best mode of carrying out the invention, and describes the invention so as to enable a person skilled in the art to make and use the invention, by presenting examples of the elements recited in the claims. The patentable scope of the invention is defined by the claims, and may include other examples that do not differ from the literal language of the claims, as well as equivalent examples with insubstantial differences from the literal language of the claims.

What is claimed is:

1. A method of adjusting burner conditions to improve temperature uniformity at an array of locations in a furnace process chamber, the method comprising:

firing a first burner into the process chamber in a first firing condition comprising a first air/fuel ratio;

firing a second burner into the process chamber in a second firing condition comprising a second air/fuel ratio; and performing temperature uniformity steps including:

a) measuring a temperature at each of an array of locations within the process chamber;

b) inducing a first temperature adjustment at each of the array of locations by adjusting the first firing condition in an amount that is predetermined to induce the first temperature adjustment at each of the array of locations;

c) inducing a second temperature adjustment at each of the array of locations by adjusting the second firing condition in an amount that is predetermined to induce the second temperature adjustment at each of the array of locations, wherein steps b) and c) are performed simultaneously; and d) after the inducing steps, measuring an adjusted temperature at each of the array of locations within the process chamber;

wherein the temperature uniformity steps are performed in iterations until the measured adjusted temperatures have a predetermined uniformity.

2. The method of claim 1, wherein the predetermined uniformity is a condition in which each of the measured adjusted temperatures is within a predetermined range of a target uniformity temperature.

3. The method of claim 1, wherein the predetermined uniformity is a condition in which an average value of the measured adjusted temperatures is within a predetermined range of a target uniformity temperature.

4. The method of claim 1, wherein the first and second temperature adjustments include adjustments that are equal and adjustments that are unequal.

5. The method of claim 1, wherein the first temperature adjustment and the second temperature adjustment are determined based on a multiple input/multiple output (MIMO) control scheme.

6. The method of claim 1, comprising performing the temperature uniformity steps for each target uniformity temperature of a plurality of target uniformity temperatures.

7. The method of claim 1, comprising firing a third burner into the process chamber in a third firing condition comprising a third air/fuel ratio, wherein the performing temperature uniformity steps further comprise inducing a third temperature adjustment at each of the array of locations by adjusting the third firing condition in an amount that is predetermined to induce the third temperature adjustment at each of the array of locations, prior to or subsequent to the steps b) and c).

* * * * *